Patented July 5, 1932

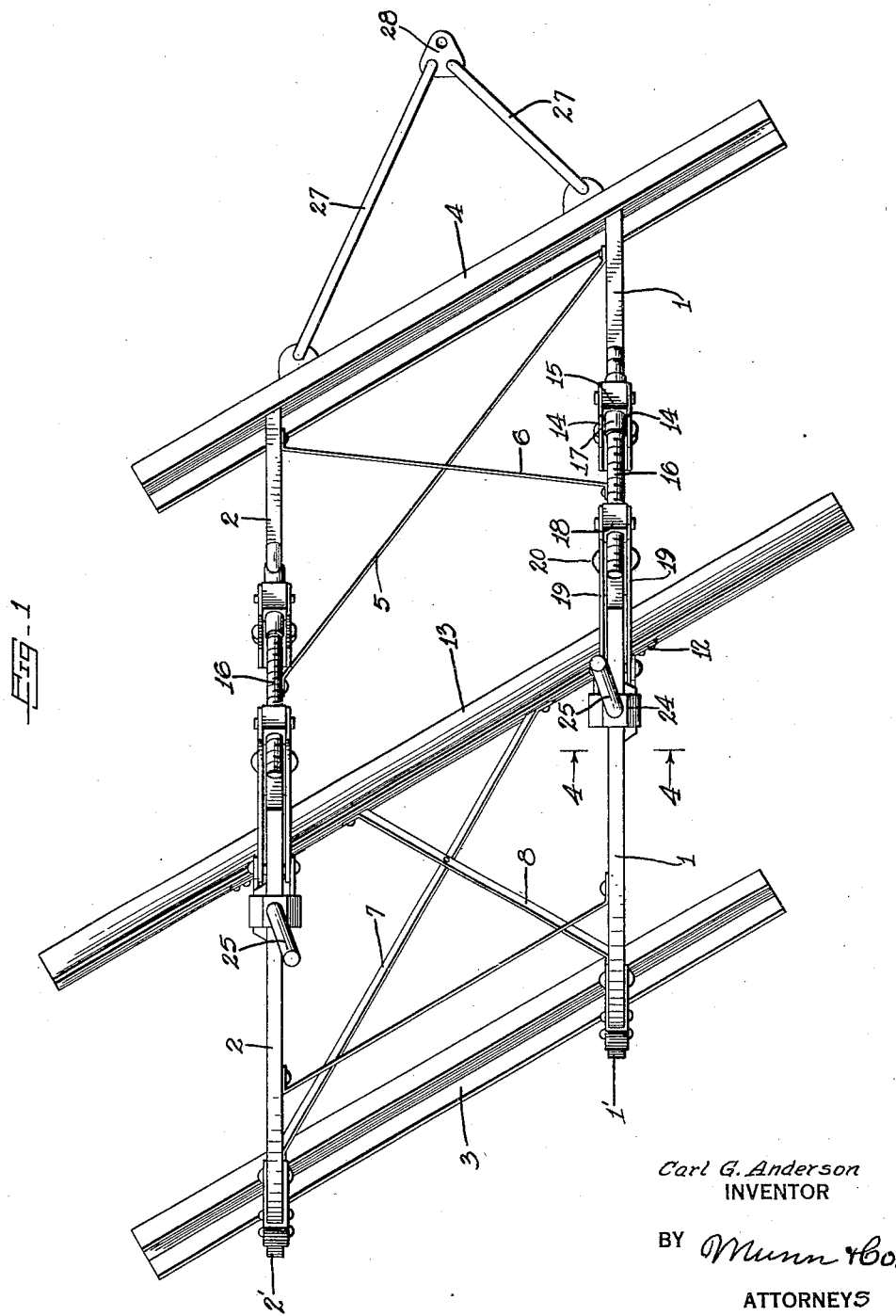

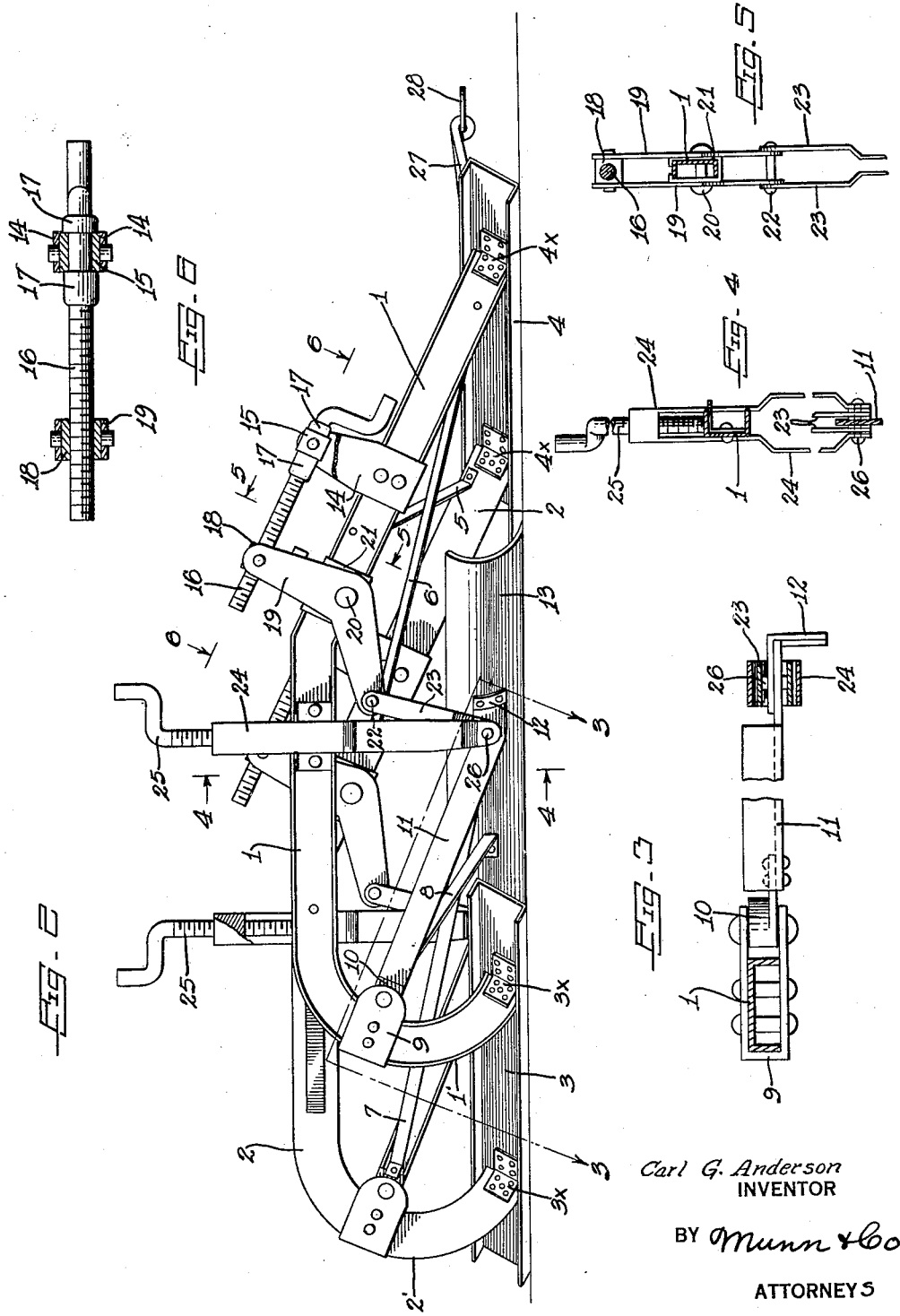

1,865,812

UNITED STATES PATENT OFFICE

CARL GUSTAV ANDERSON, OF BELLWOOD, ILLINOIS

ROAD MAINTENANCE MACHINE

REISSUED

Application filed May 25, 1931. Serial No. 539,958.

My invention relates to improvements in road maintenance machines, and it consists in the combinations, constructions, and arrangements herein described and claimed.

An object of my invention is to provide a device which is relatively cheap to build but which will keep the road in better condition than the ordinary drag.

A further object is to provide a device having a cutting blade that can be brought quickly to a predetermined position or raised therefrom at will.

A further object is to provide a device in which the inequalities in the road may be readily removed due to the provision of scraper bars in advance and to the rear of a cutter so that, even if the forward scraper bar should ride over irregularities, the latter will be cut by the cutter bar and spread by the rear scraper bar.

Other objects and advantages will appear in the following specification, and the novel features of the invention will be particularly pointed out in the appended claims.

My invention is illustrated in the accompanying drawings, forming part of this application, in which Figure 1 is a top plan view of my invention, Figure 2 is a side elevational view of the device shown in Figure 1, Figure 3 is an enlarged sectional detail view taken along the line 3—3 of Figure 2.

Figure 4 is a section taken along the lines 4—4 of Figure 1 and 4—4 of Figure 2, Figure 5 is a section taken along the line 5—5 of Figure 2, and Figure 6 is an enlarged detail sectional view taken along the lines 6—6 of Figure 2.

In carrying out my invention, I make use of a pair of side members such as those shown at 1 and 2. As will be seen from the drawings these bars are made of channel iron. Each of these side members is curved at its rear end as shown at 1' and 2', respectively, and has a downwardly inclined front portion. Secured to the ends of the curved portions 1' and 2' is a scraper bar 3 which is also made of channel iron and which is held in position by means of plates $3^x$. The ends 1' and 2' are cut off so that when the bar 3 is placed against these ends the scraper bar is forwardly inclined.

The front ends of the bars 1 and 2 are similarly cut to receive a front scraper bar 4 which is held by plates $4^x$. The front scraper bar is forwardly inclined and both the front and rear scraper bars are disposed so that one end is in advance of the other, see Figure 1. Brace rods 5, 6, 7, and 8 are provided for rigidly holding the side members in position.

Secured to the curved portion 1' is a hinge plate 9 having a forked end arranged to receive a connector plate 10 to which is secured a bar 11 having a connecting means 12 at its end. A similar arrangement is secured to the companion side member. The connecting means 12 are firmly secured to a curved cutter bar or blade 13. This cutter bar extends substantially parallel with the front and rear scraper bars as shown in Figure 1.

In order to provide for raising and lowering of the cutter bar, I make use of an arrangement which is secured to each of the side members. A description of one will suffice for both. This consists in a pair of plates 14 secured to the side member 1 between which is pivotally mounted a block 15 having an opening therethrough for receiving the shank of a screw 16. The shank is provided with stop members 17 so as to permit rotation of the shaft of the screw. The end of the latter passes through a threaded block 18 which is carried by a pair of bell crank levers 19. These levers are pivoted on a pin or bolt 20 which passes through a plate 21 and through the wall of the side 1. The ends of the bell crank levers are pivotally connected at 22 by means of links 23 to the connector portion 12. It will be understood that a similar raising or lowering means for the cutter is disposed on the side 2.

An adjusting means is provided for each end of the cutter bar. This consists of a yoke 24 which straddles the side such as that shown at 1 and which is provided with a screw 25 that bears on the upper edge of the channel iron side 1. This yoke is fastened to the connecting member 12 at 26 as are the levers 23.

From the foregoing description of the various parts of the device, the operation thereof may be readily understood.

The device is designed to be used in the manner of a drag. That is to say, it is not provided with wheels. To this end forwardly extending rods 27 are provided which are secured to a draft ring 28, these bars being attached to the forward scraper bar. The handles of the adjusting screws 16 and 25 are turned so as to swing the cutter bar 13 on its pivots to the desired position which is just clear of the ground when the front and rear scraper bars are on a smooth surface. Now when the device is drawn along a road with ruts or other inequalities, the forward scraper bar will tend to smooth these ruts off and to pass the dirt or rocks which have accumulated in front of it from the side 1 toward the side 2. It frequently happens that the scraper bar will meet some obstacle such as a slight rise in the ground which will tend to lift the scraper bar so that it may ride over it to some extent and then settle down when the obstruction has been passed. This same obstruction, however, when it reaches the cutter bar, will be cut off and the cut portions will be shifted toward the side so as to fill up any of the wheel tracks or depressions. The distribution of the material is further facilitated by the rear scraper bar so that when the machine has passed a given point the road is fairly smooth.

In going over a hill it may be necessary to raise the cutter and this is done by means of the screws 16. The latter may be turned very rapidly so as to lift the ends of the cutter and then when the obstruction is passed, the screws may be turned quickly to lower the cutter but it cannot be lowered beyond the point set by the adjusting screws 25. The latter, therefore, serve as a gauge to permit the quick raising and lowering of the cutter blades and the accurate adjustment. This is of prime importance in working the roads because without the adjusting screws considerable time would be wasted in endeavoring to locate the cutter blade at the proper position. It will be noted that although the cutter blade is moved the scraper blades remain in contact with the road at all times.

The device is simple in construction but is made rigid to stand wear and the channel bars are of sufficient weight to keep the machine on the road and to provide a device which will smooth off irregularities rather than to ride over them.

The links 23 may be pivotally secured to the connector portion 12 by a pin 26. The yoke is fastened to the connecting member 12 at 26 as are the links 23.

It will be noted that the base portion of the screw 25 abuts the channel arm side 1 in such a manner that the blade 13 is prevented from being lowered below a predetermined point. This limitation prevents the blade from sinking into depressions in the road and bouncing up again as it comes in contact with the higher portion of the road. I have found that this arrangement prevents the blade from chattering and making transverse ridges across the road. The chattering of the blade places the entire structure under such strains and stresses that the useful life of an ordinary road maintenance machine is greatly shortened.

I claim:

1. A road maintenance machine comprising a frame consisting of a pair of parallel side members, each of said side members being curved downwardly and forwardly at its rear edge, a scraper bar secured to the forwardly curving portions and being inclined forwardly from the vertical, said side members being inclined downwardly at their front ends, a scraper bar secured to the front ends and being inclined forwardly from the vertical, said front and rear scraper bars being in parallel relation and one end of each of said scraper bars being disposed in advance of the other end, a cutter bar disposed between said scraper bars and in parallel relation therewith, each end of said cutter bar having secured thereto an arm, each of said arms being pivotally connected to the respective side members at the curved portions thereof, a yoke straddling each of said side members and being pivotally connected to an arm, each of said yokes bearing a screw having engagement with the upper edge of its respective side member for adjusting the cutter bar, a bell crank lever carried by each of said side members, links connecting said bell crank levers to said arms, a threaded block carried by each bell crank lever, a bracket carried by each of said side members, a bearing block carried by each of said brackets, and a screw passing through each bearing block whereby an auxiliary raising or lowering means is provided for said cutter bar.

2. A road maintenance machine comprising a pair of parallel side members, means for securing the side members together, one of said side members being disposed in advance of the other, a rear scraper bar secured to the rear ends of said side members and being inclined forwardly from the vertical, a front scraper bar secured to the front ends of said side members and being inclined forwardly from the vertical, said scraper bars being parallel with one another, a cutter bar disposed between the scraper bars, means for raising or lowering each end of said cutter bar, and means independent of the raising and lowering means for adjusting the extreme position to which the cutter bar may be lowered.

3. A road maintenance machine comprising a pair of parallel side members, one of said side members being disposed in advance of the other, a rear scraper bar rigidly secured to the rear ends of said side members, a front scraper secured to the front ends of said side members, said scraper bars being parallel, a cutter bar disposed in parallel relation with said scraper bars between the latter, means for raising and lowering each end of said cutter bar, and means independent of the raising and lowering means for adjusting the extreme position to which the cutter bar may be lowered.

CARL GUSTAV ANDERSON.